Figure 1:
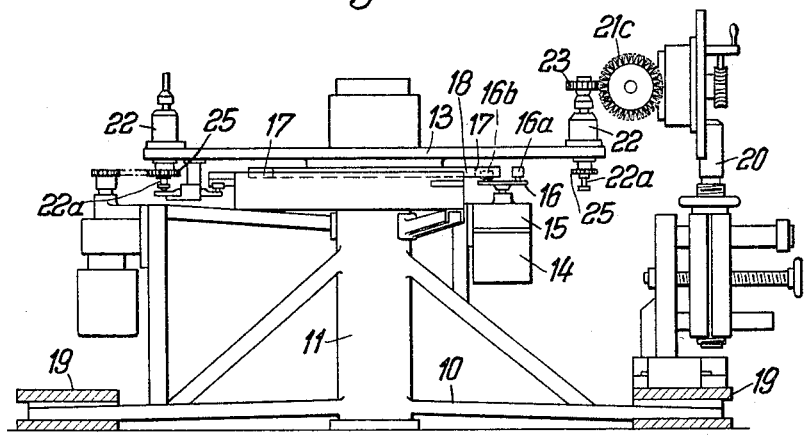

Nov. 15, 1966  G. KEHR  3,285,134
APPARATUS FOR THE FINAL MACHINING OF GEARS
Filed Sept. 2, 1964  8 Sheets-Sheet 1

Inventor:
Günter Kehr
BY
James E. Bryan

Inventor.
Günter Kehr
BY James E. Bryan

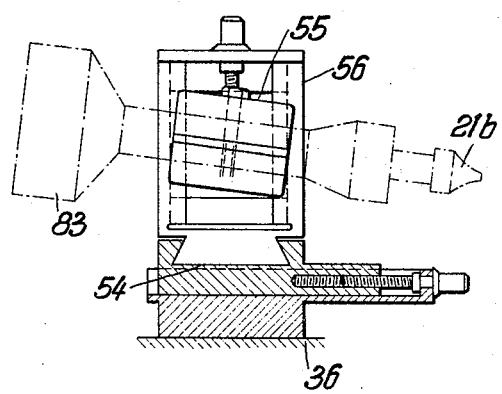
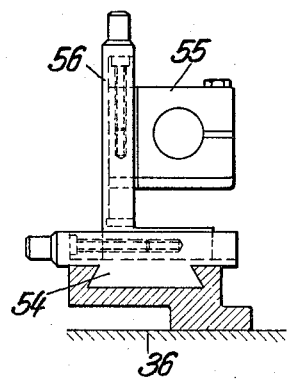
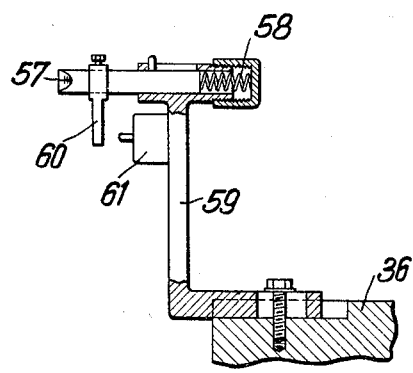

Nov. 15, 1966          G. KEHR          3,285,134

APPARATUS FOR THE FINAL MACHINING OF GEARS

Filed Sept. 2, 1964          8 Sheets-Sheet 8

Inventor:
Günter Kehr
BY
James E. Bryan

United States Patent Office
3,285,134
Patented Nov. 15, 1966

3,285,134
APPARATUS FOR THE FINAL MACHINING
OF GEARS
Günter Kehr, Bremen, Germany
(Barssel, Oldenburg, Germany)
Filed Sept. 2, 1964, Ser. No. 393,960
Claims priority, application Germany, Sept. 7, 1963,
K 50,761
11 Claims. (Cl. 90—9)

The present invention relates to an apparatus for finishing gears in which a plurality of tools are adjustably mounted on supports secured to a machine frame or base, the tools including cutting tools, milling cutters, and rotary brushes. The gears are indexed in succession to a number of working stations while being supported on a rotatable worktable and the gears are subjected to machining by the tools at the various work stations.

Machines for performing operations of the type performed by the apparatus of the present invention are used for deburring and cleaning the most diversified forms and shapes of workpieces. Turning tools are provided for removing the rough burrs from wheels and rotary brushes for removing the fine burrs. It is also known to employ milling tools or milling cutters for cleaning bores, particularly in the longitudinal bores in discs or disc wheels. In this operation, a milling tool or milling cutter is advanced vertically, or at a right angle, to the longitudinal bore.

The present invention represents an improvement over known machines and is an apparatus which can be employed with particular advantage specifically for finishing gears. The apparatus of the present invention not only removes the rough and fine burrs from gears but also mills the gear teeth, in order to reduce the likelihood of breakage thereof in use.

The apparatus of the present invention includes at least one working station where a milling tool or milling cutter is provided for machining the teeth of gears, the milling station being provided between a working station for removing the rough burrs from the gear teeth and a working station where rotary brushes are employed to remove fine burrs from gear teeth. It is advantageous in the apparatus of the invention to provide two milling tools or milling cutters at the milling station, each of which simultaneously mills the area between two adjacent gear teeth.

Using the apparatus of the present invention, it is possible for the first time during the deburring of gears to also mill the gear teeth, the latter operation being performed automatically in the course of the deburring and cleaning operations. The incorporation of a milling station in the apparatus of the invention eliminates the necessity for a further milling station, which would otherwise be required.

Figure 2:
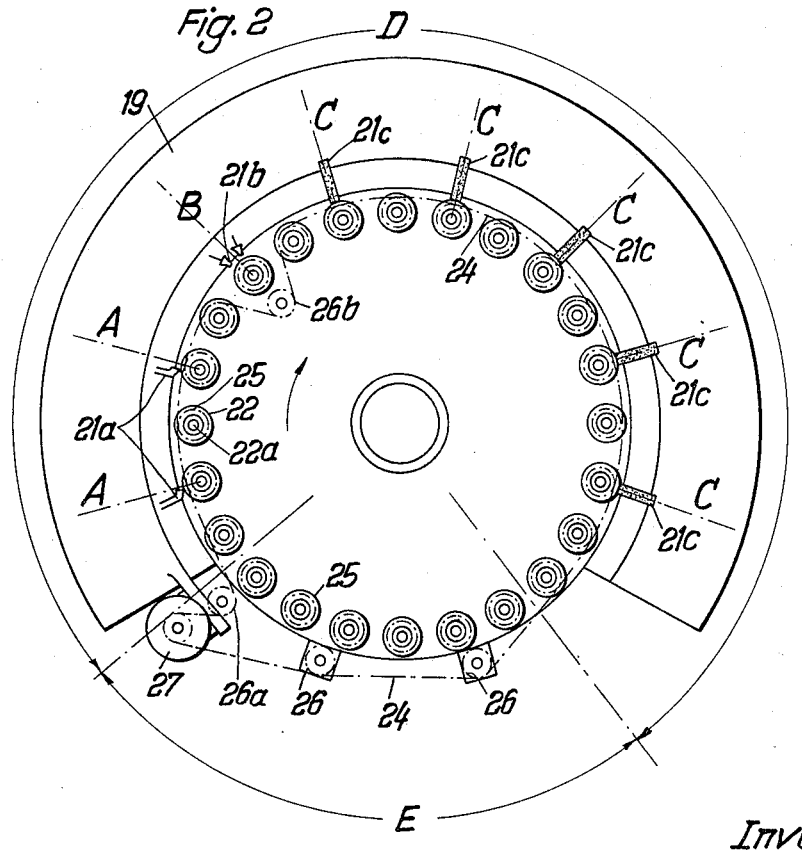
Figure 3:
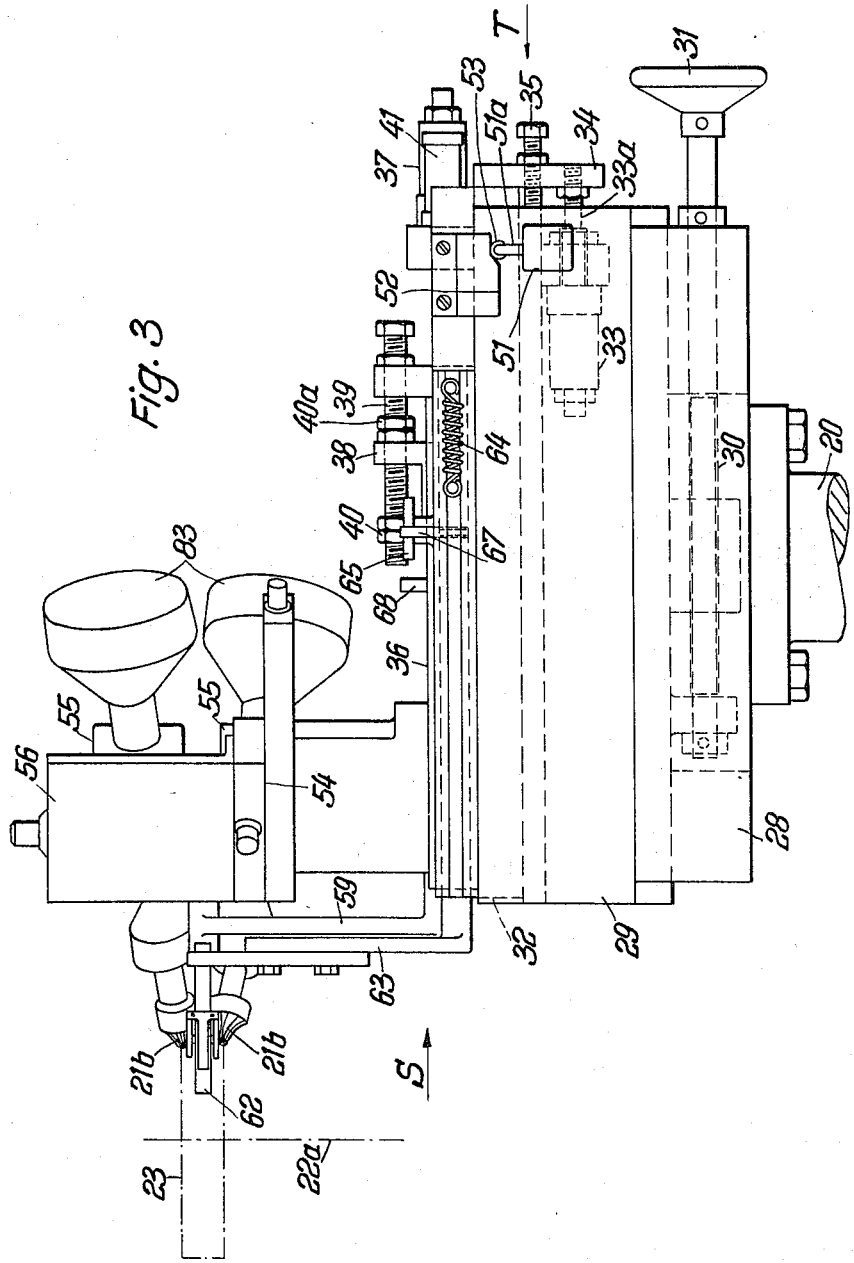
Figure 4:
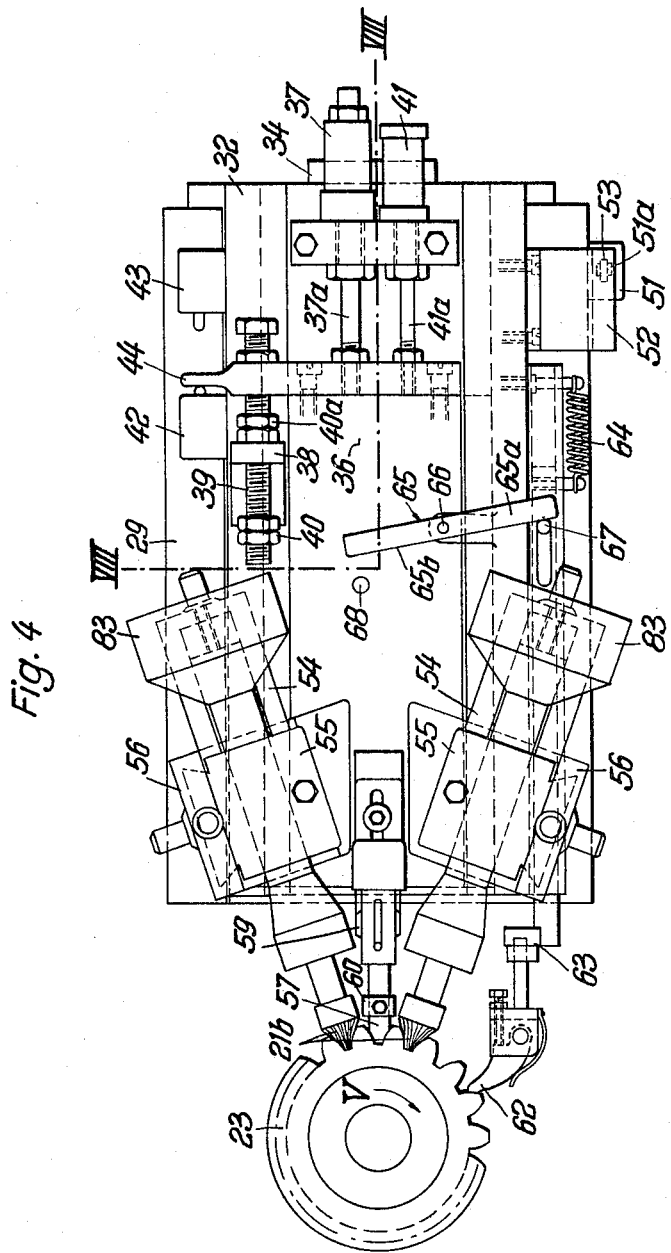
Figure 5:
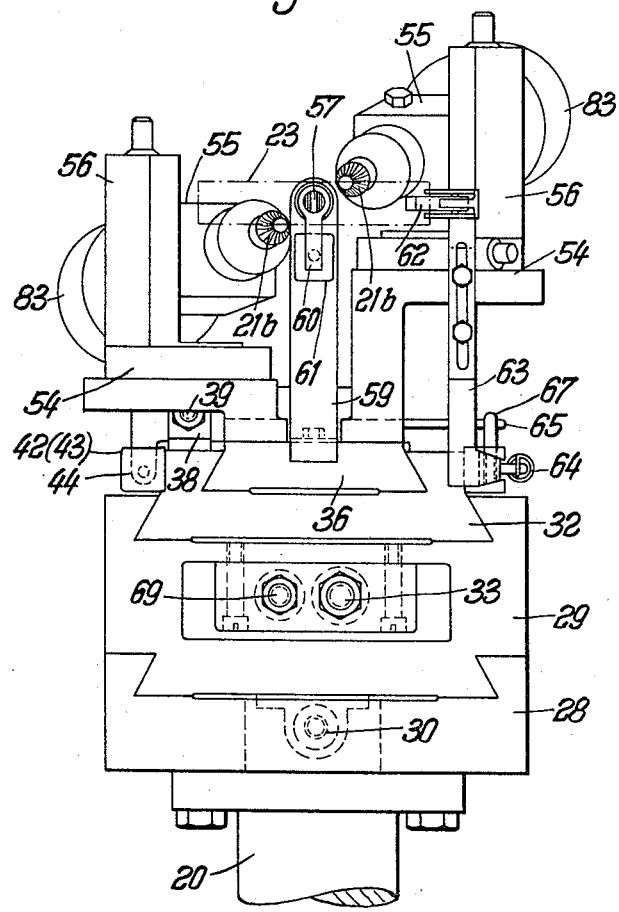
Figure 6:
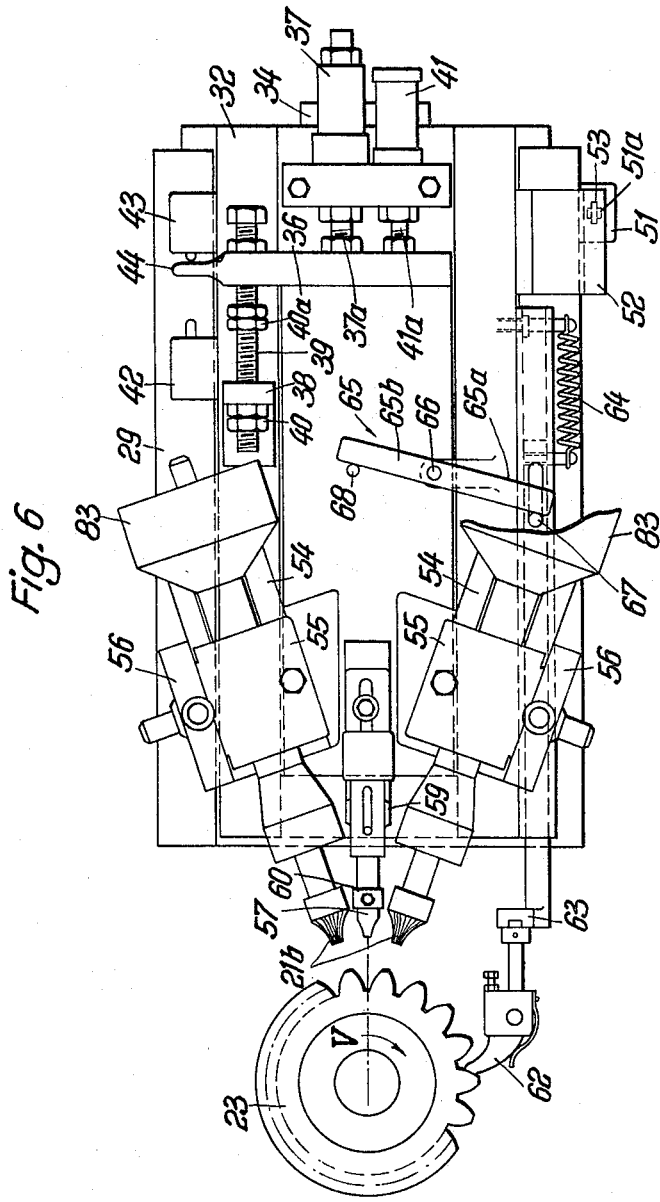
Figure 7:
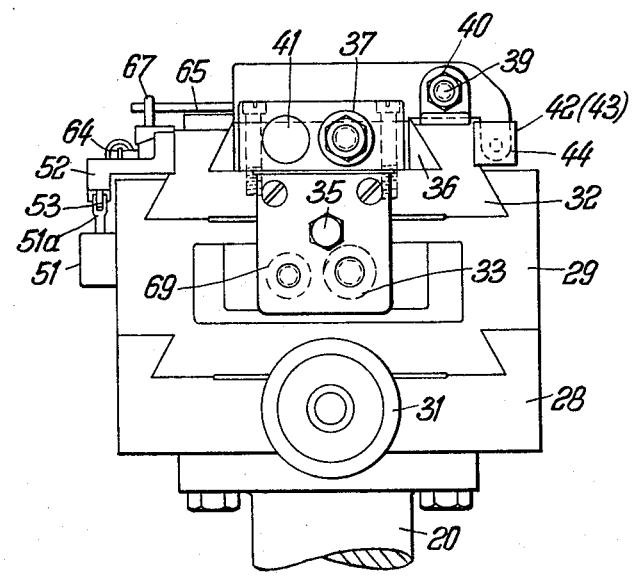
Figure 8:
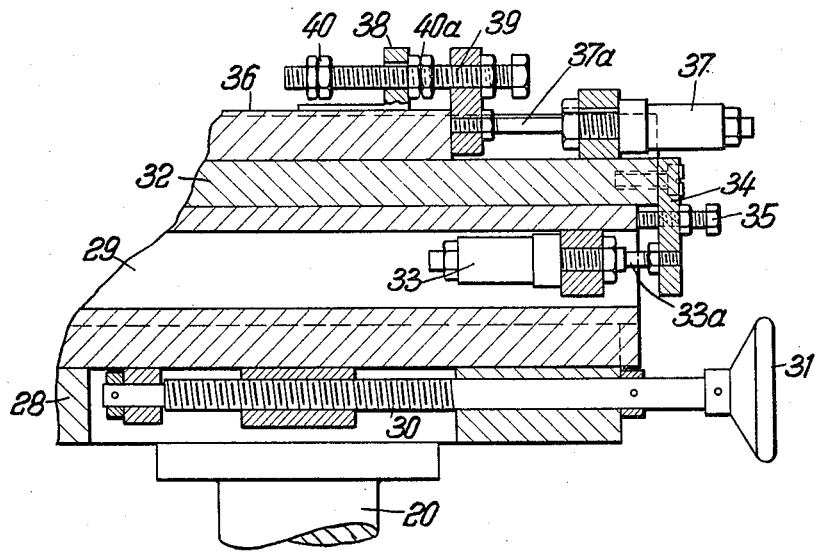
Figure 12:
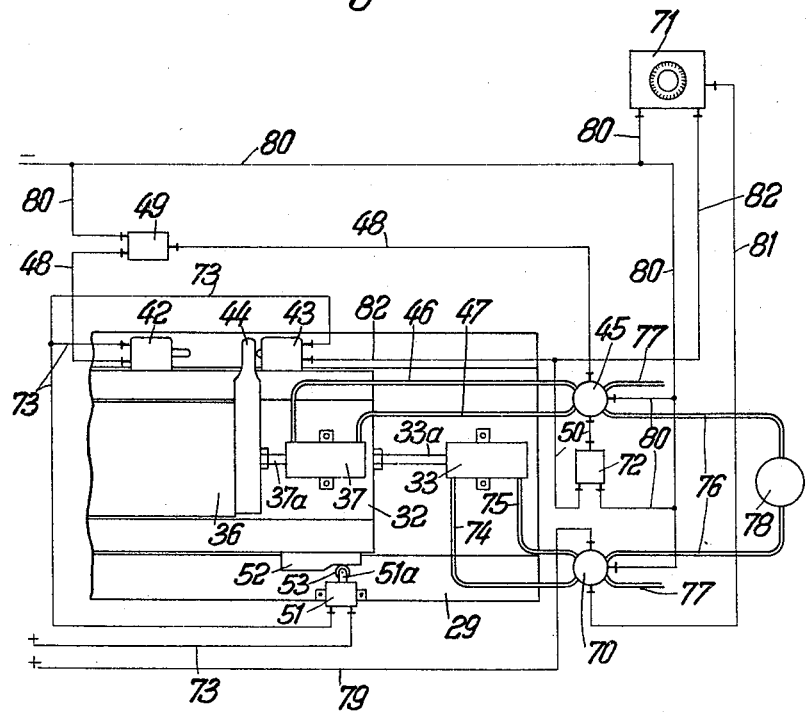

The invention will be further illustrated by reference to the accompanying drawings in which FIGURE 1 is a view in elevation, partially in section, of a deburring and milling machine according to the present invention, FIGURE 2 is a plan view of the device of FIGURE 1, FIGURE 3 is a view in elevation of the milling station, shown in the milling position, FIGURE 4 is a plan view of the milling station shown in FIGURE 3, FIGURE 5 is a view in elevation looking in the direction of the arrow S in FIGURE 3, FIGURE 6 is a plan view corresponding to FIGURE 4 showing the milling carriage in the withdrawn position and after the gear to be milled has been rotated a distance corresponding to the width of one tooth, FIGURE 7 is a view in elevation looking in the direction of the arrow T in FIGURE 3, the milling tool supports being omitted, FIGURE 8 is a view in section taken on line VIII—VIII of FIGURE 4, FIGURE 9 is a view in detail showing a milling tool support with a milling tool mounted therein, the latter being shown in phantom, FIGURE 10 is a view of the support of FIGURE 9 rotated 90 degrees with the milling tool omitted, FIGURE 11 is a view partially in section through an arresting device for the gear to be machined, and FIGURE 12 is a wiring diagram for the apparatus.

As shown in FIGURES 1 and 2, the apparatus includes a stationary machine frame or base 10 including a central support 11 on which a table 13 is rotatably mounted. The table 13 is rotated by means of a motor mounted on the machine frame 10 through a series of transmission gears 15 in a pilgrim step motion. This latter may be effected, for example, by means of a crank 16, driven by the motor 14, and the crank pins 16a and 16b which engage in the radial slots 17 of a driving disc 19 secured to the table 13. For rotating the table, it is also possible to utilize a pinion gear system, a Maltese cross, or other equivalent means.

A plurality of tools, specifically the cutting tools 21a, the milling cutters 21b, and the rotary brushes 21c, for finishing the gears 23 are adjustably mounted around the periphery of the rotary table 13 on the supports 20 which latter are mounted on the machine frame 10, for example on a stationary bearing ring 19 thereof. The supports 20 for the tools 21a, 21b, and 21c, are vertically adjustable and conventional means are employed for adjustment as illustrated, for example, in FIGURE 1. The tools 21a, 21b, and 21c represent individual working or operating stations A, B, and C, as shown in FIGURE 2. Various numbers of such stations may be provided for in different cases but, according to a preferred embodiment of the present invention, a total of eight working stations is present. Thus, in the direction of rotation of the rotary table 13, there are two working stations A with the cutting tools 21a, one working station B with the milling cutters 21b, and five working stations C with the rotary brushes 21c. Taken together, they constitute the machining or working station D. The individual tools are advanced to the gears 23 to be machined.

A plurality of supports 22 are provided at the periphery of the table 13 and serve to rotatably support and position the gears 23. The latter are conveyed to the tools 21 by an indexing movement of the table 13 in the direction of the arrow U. The gears 23 are thus successively machined, or operated on, by the tools 21a, 21b, and 21c. The gears 23 are continually rotated throughout the machining station D, with the exception of the working station B. The rotation of the workpieces is effected by means of a chain 24 which drives the sprockets 25 mounted on the shaft 22a of the supports 22 for the gears 23. The chain 24 is driven by the motor 27. The gears 23 are not rotated in the setting station E, shown in FIGURE 2, since in this station there are no working stations at the rotary table 13 and no tools. In the setting station E, the chain 24 is prevented from engaging with the sprockets 25 by means of the guide wheels 26 and 26a, shown in FIGURE 2; the guide wheel 26a also acts as a tension wheel.

Also, the sprocket 25 at the working station B, which working station includes the milling cutters 21b, is not driven by the chain 24. At this station, the chain 24 is guided over a guide wheel 26b and, thus, prevented from engaging the sprocket 25 on the support 22 at working station B. The gear 23 to be machined at working station B is also indexed by a distance corresponding to the distance between two adjacent teeth, as described in further detail below.

Two milling cutters 21b are mounted at the working station B for the simultaneous machining of the area between two adjacent gear teeth by each cutter. In order to assure the proper positioning of the milling cutters 21b, the support 20 includes a base plate 28 secured thereto. A setting carriage 29, which is adjustable in known manner by means of a spindle 30 and handwheel 31, is slidably mounted on the base plate 28. A ready carriage 32 is slidably mounted on the setting carriage 29, the carriage 32 being actuated by a ready air pressure cylinder 33 which latter is mounted on the setting carriage 29. The piston rod 33a acts on a connecting plate 34 which, in turn, is secured to the ready carriage 32. The connecting plate 34 is provided with an adjustable setscrew 35 for regulating the end of the stroke of the ready carriage 32 during the advance thereof. The ready carriage 32 is further coupled with the piston rod of a double-acting brake cylinder 69 which latter prevents a hard impact at the end of a stroke. The brake cylinder 69 is rigidly secured to the setting carriage 29 similarly to the ready air pressure cylinder 33 mounted adjacent thereto.

The ready air pressure cylinder 33 is double-acting and it is regulated by means of an electromagnetic valve 70 to which the pressure conduits 74 and 75 connect. This is effected in a manner such that for the advance of the ready carriage 32 into a position of readiness, the regulation occurs from the rotary table 13 after the completion of one step-wise partial rotation thereof and, for the return stroke of the carriage from the position of readiness, an electric impulse counter 71 is used, the counter being set with regard to the number of teeth on the gear 23 to be machined and after one complete rotation thereof.

A milling carriage 36 is reciprocatably mounted on the ready carriage 32 and is continuously advanced into the milling position by a working air pressure cylinder 37 as soon as the ready carriage 32 is in the position of readiness. After the completed machining of two areas between two adjacent teeth by the milling cutters, the milling carriage is withdrawn and the gear 23 is simultaneously further rotated by a distance corresponding to the distance between two adjacent teeth, as will be further described below. The milling carriage 36 is then again advanced to the milling position by the working air pressure cylinder 37. The latter is rigidly mounted on the ready carriage 32 and the piston rod 37a thereof engages the milling carriage 36. For the purpose of delimiting the advance and return stroke of the milling carriage 36, the ready carriage 32 is provided with an abutment or stop 38. A setscrew 39 in the milling carriage 36, having adjustable stop nuts 40 and 40a thereon, coacts with the abutment or stop 38, as shown in FIGURE 4.

In order to prevent an excessive impact in the two end positions of the stroke of the milling carriage 36, a double-acting brake cylinder 41 is mounted on the ready carriage 32 with the piston 41a thereof connected to the milling carriage 36.

A pair of switches 42 and 43 mounted on the ready carriage 32 are actuated at the ends of the stroke of the milling carriage by an abutment or stop 44 on the milling carriage. These switches serve for the regulation of the working air pressure cylinder 37 and, thus, of the milling carriage 36. The switches 42 and 43 actuate a conventional electromagnetic valve 45 to which are connected the pressure conduits 46 and 47 of the working air pressure cylinder 37. Also connected in the electric control line 48 from the switch 42, which latter is actuated in the milling position of the milling carriage 36 by the abutment or stop 44, to the electromagnetic valve 45 is a time delay relay 49 so that the switch 42 can actuate the valve 45 only with a delay. The time delay of the delay relay 49 is set for the milling time required to machine the area between two adjacent teeth of a gear 23. The switch 43, which is actuated in the withdrawn position of the milling carriage 36 by the stop 44, i.e., in the position shown in FIGURE 6 of the drawings, is also connected with the valve 45 with the interpolation of a time delay relay 72, by means of the line 50, so that the valve 45 is equally actuated with a time delay by means of the switch 43. The delay time of the delay relay 72 is set so that after a complete rotation of the gear wheel 23 to be machined at working station B, the impulse counter 71 will actuate the valve 70 for the return stroke of the ready carriage 32 from the position of readiness.

The switches 42 and 43 are, in turn, included in and removed from the circuit by a switch 51 mounted on the setting carriage 29, the switch 51 being actuated by a cam 52 mounted on the ready carriage 32. The switch lever 51a with the cam follower 53 thereon abuts against the cam 52. The switch 51 is connected with the switches 42 and 43 by the electric lines or wires 73. In the position of readiness of the ready carriage 32, as shown in FIGURES 3, 4, and 6, the switches 42 and 43 are included in the circuit so that the working air pressure cylinder 37 is operative and, as a result thereof, the milling carriage 36 reciprocates with a time delay at the end of each stroke.

The two milling cutters 21b are mounted on the milling carriage 36 in a cross slide or compound slide rest 54, of known construction, in a manner such that they are displaceable both longitudinally and transversely. The milling cutters are retained in each case in a bearing block 55 which latter is vertically displaceable in a stand 56 mounted on the cross slide 54.

Between the two milling tools 21b, an arresting or stopping bolt 57 is displaceably mounted on the milling carriage 36 by means of an angle bracket 59. The stopping bolt 57 is biased to the left, as shown in FIGURE 11, by the compression spring 58 and is provided with an abutment or stop 60 which is adapted to engage with a microswitch 61. During the advance of the milling carriage 36 into the milling position, as shown in FIGURE 4, the stopping bolt 57 engages the gap between two adjacent teeth on the gear wheel 23 to be machined. The stopping bolt 57 also simultaneously serves for centering the gear wheel if the latter has not been accurately rotated a distance corresponding to the distance between two adjacent teeth. For this purpose, the stopping bolt 57 is conically shaped in the front portion thereof, as shown in FIGURES 4 and 6. In case the gear wheel 23 has been inaccurately rotated so that one tooth is positioned directly in front of the stopping bolt 57, the latter is pushed back against the action of the spring 58 and the microswitch 61 will be actuated by the stop 60, with the result that the entire machine will be rendered inoperative.

A ratchet 62 is provided for indexing the gear wheel 23 a distance corresponding to the distance between two adjacent teeth after the machining of the preceding tooth. The ratchet 62 is displaceably mounted on the ready carriage 32 by means of a linkage 63 and against the action of a tension spring 64, which tends to pull the linkage 63 of the ratchet 62 to the right as shown in FIGURE 4. A double lever 65, which is pivotably mounted on the ready carriage 32 by means of the pin 66 is in operative engagement with the linkage 63. With one arm 65a, the double lever 65 abuts against a stop 67 of the linkage 63, while the other arm 65b contacts a stop 68 on the milling carriage 36. When the milling carriage 36 is withdrawn to the right, as shown in FIGURE 6, the double lever 65 is pivoted by the stop 68 and the linkage 63 is thereby advanced against the action of the tension spring 64 with the result that the ratchet 62 indexes the gear wheel 23 forwardly, in the direction of the arrow V, by one tooth after the milling cutters 21b and the blocking bolt 57 have been disengaged from the gear wheel 23, as shown in FIGURE 6. As soon as the milling carriage 36 is advanced to the left into the milling position, as shown in FIGURE 4, the stop 68 releases the double lever 65 with the result that the linkage 63 and the ratchet 62 are pulled to the right by the tension spring 64, this being effected to a degree such that the ratchet 62 will engage the next following tooth on the gear wheel 23.

The regulation or control of the ready air pressure cylinder 33 and of the working air pressure cylinder 37 for the movement of the ready carriage 32 and the milling carriage 36, is shown in FIGURE 12. The electromagnetic valves 70 and 45 are connected on one side with the cylinders 33 and 37, respectively, and by means of the pressure conduits 74, 75, and 46, 47, respectively, and on the other side they are connected with a pressure source 78 by means of the air pressure conduit 76. Two vent lines 77 are provided which discharge to the atmosphere. By actuating the valves 70 and 45, the air pressure conduits 74, 75, and 46, 47, respectively, are connected alternately with the air pressure conduit 76 and with the vent pipes 77, respectively.

The electromagnetic valve 70 is connected in the electric circuit by means of the electric wires or lines 79 and 80. Inserted into the line 79 is a conventional switch (not shown) which may be actuated from the rotary table 13 and by means of which the electromagnetic valve 70 is actuated in a manner such that the air pressure conduit 75 of the ready air pressure cylinder 33 is connected with the pressure source 78, through the compressed air conduit 76, so that the piston rod 33a is displaced towards the left, as shown in the drawings, and the ready carriage 32 is advanced toward the left into a position of readiness.

The electromagnetic valve 70 is also regulated or controlled by the electric impulse counter 71 which is connected with the valve 70 by means of an electric line 81 and is also connected in the electric circuit by means of the electric line or wire 80. The impulse counter 71 receives pulses from the switch 43 through the wire or line 82, the switch 43 being actuated by the abutment or stop 44 on the milling carriage 36. The impulse counter 71 is set in accordance with the number of teeth on the gear wheel 23 to be machined. After one complete rotation of the gear wheel 23, i.e., when the latter has been completely machined, the impulse counter 71 will actuate the valve 70, through the line 81, in a manner such that the air pressure conduit 74 is connected with the pressure source 78 through the air pressure conduit 76, with the result that the piston rod 33a is displaced toward the right, as shown in the drawings, and the ready carriage 32 is withdrawn from the position of readiness.

The electromagnetic valve 45 is regulated by the switches 42 and 43 which, in turn, are actuated by the abutment or stop 44 on the milling carriage 36 during reciprocation of the latter. The switches 42 and 43 are connected in the electric circuit through the switch 51, by the electric lines or wires 73, 48, 80, and 73, 82, 50, and 80, respectively, only after the ready carriage 32 has been advanced to the left into a position of readiness, as shown in the drawings, and the switch 51 has thus been actuated by the cam 52. As soon as the ready carriage 32 is withdrawn from the position of readiness towards the right, as shown in the drawings, the switch 51 is actuated by the cam 52 so that the switches 42 and 43 become inoperative.

The switches 42 and 43 are electrically connected with the electromagnetic valve 45 by way of the time delay relays 49 and 72, respectively, with the result that the valve 45 may be operated by the switches 42 and 43 only with a desired adjustable time delay.

The operation of the milling station B is as follows: The impulse counter 71 is set in accordance with the number of teeth on a gear 23 to be machined. The setting carriage is set up manually, by means of the spindle 30 and handwheel 31, to the position which is appropriate for the particular gear 23. The milling cutters 21b are manually set or adjusted by means of the cross slide 54 and the stand 56 with respect to the gear 23. As soon as the rotary table 13 has been rotated stepwise by one station and, thus, a gear to be machined is positioned at the milling station B, the electromagnetic valve 70 is actuated and the ready carriage 72 is brought into a position of readiness whereby the two switches 42 and 43 are included in the electric circuit through the switch 51. The milling carriage 36 is positioned in the withdrawn position, as shown in FIGURES 6 and 12, with the abutment or stop 44 actuating the switch 43. As a result, the electromagnetic valve 45 is actuated in a manner such that the compressed air conduit 47 of the working air pressure cylinder 37 is connected to the air pressure conduit 76 and thereby with the pressure source 78. The piston rod 37a of the working air pressure cylinder 37 is displaced towards the left in FIGURE 12 and, thus, the milling carriage 36 is displaced into the milling position thereof, as shown in FIGURES 3 and 4. In the milling position, the switch 42 is actuated by the abutment or stop 44 which causes the electromagnetic valve 45 to be actuated with a time delay, by means of the time delay relay 49, so that the air pressure conduit 46 of the working air pressure cylinder 37 is connected with a delay with the air pressure conduit 76 and the pressure source 78. The delay time of the time delay relay 49 is set according to the time required to machine one tooth on the gear 23. As soon as the electromagnetic valve 45 is actuated, the milling carriage 36 is withdrawn by the working air pressure cylinder 37 from the milling position toward the right, as shown in FIGURE 12, whereby the switch 43 is again actuated by the abutment or stop 44. With each operation of the switch 43, the impulse counter 71 receives a pulse through the wire or line 82. Moreover, the switch 43 operates, through the time delay relay 72, the electromagnetic valve 45 in a manner such that the air pressure conduit 47 is connected with a delay with the air pressure conduit 76 and the pressure source 78 so that the milling carriage 36 will again be advanced into the milling position.

As long as one gear is being machined, the time delay relay 72 is actually not required. The function thereof is to operate the electromagnetic valve 45 after the completed machining of a gear with such a time delay that the impulse counter 71 operates, by way of the line 81, the electromagnetic valve 70 connected to the ready air pressure cylinder 33 so that the ready carriage 32 is withdrawn from a position of readiness to the right, as shown in FIGURE 12. As a result, the switches 42 and 43 are rendered inoperative by means of the switch 51 and the cam 52 so that the milling carriage 36 will not reciprocate while the ready carriage 32 is withdrawn from the position of readiness. Only after another gear to be machined has been positioned at the working station B, by rotation of the table 13 in a stepwise or indexed manner, will the machining procedure begin again as described above.

The milling cutters 21b are driven in each case by conventionally known motors, for example, compressed air motors 83 which are clamped into the bearing blocks 55. The cutters are preferably driven at high speed, for example at about 60,000 r.p.m.

It will be obvious to those skilled in the art that many modifications may be made within the scope of the present invention without departing from the spirit thereof, and the invention includes all such modifications.

What is claimed is:

1. An apparatus for the final machining of gears which comprises a rotatable work-supporting table, means for mounting a plurality of gears on the table, and means for indexing the table and gears to a plurality of working stations, the stations including means for removing rough burrs from the gears, means for milling the gear teeth and means for removing fine burrs from the gears, the means for milling the gear teeth including a plurality of milling cutters each of which mills at least one area between two adjacent teeth and the means for milling the gear teeth further including means for automatically engaging the milling cutters with a gear to be machined and means for preventing movement of the gear during machining.

2. An apparatus according to claim 1 in which each of the milling cutters is mounted in a vertically displaceable bearing block, the latter being mounted on a cross slide secured to a milling carriage.

3. An apparatus according to claim 1 in which the milling cutters are supported on a reciprocatable milling carriage, which latter is, in turn, supported on a reciprocatable ready carriage.

4. An apparatus according to claim 3 including spindle and handwheel means for positioning the ready carriage adjacent the table.

5. An apparatus according to claim 3 in which switch means actuated by the milling carriage is connected in and disconnected from an operating electric circuit for the apparatus by switch means mounted on a setting carriage, the latter switch means being actuated by a cam on the ready carriage.

6. An apparatus according to claim 3 in which a gear to be machined is rotated on the work-supporting table by ratchet means displaceably mounted on the ready carriage.

7. An apparatus according to claim 3 in which the milling carriage and the ready carriage are each connected to a double-acting brake means to prevent excessive impacts at the end of working strokes.

8. An apparatus according to claim 3 in which the ready carriage is reciprocated by air pressure means, the latter being regulated by electromagnetic valve means, the electromagnetic valve means being actuated by an impulse counter, the latter being set in accordance with the number of teeth on a gear to be machined.

9. An apparatus according to claim 8 in which the impulse counter receives pulses from switch means on the ready carriage.

10. An apparatus according to claim 3 including blocking bolt means displaceably mounted on the milling carriage and being adapted to engage a space between the teeth of a gear to be machined.

11. An apparatus according to claim 10 in which the blocking bolt means includes microswitch means adapted to be actuated by the blocking bolt means upon displacement of the latter by an improperly positioned gear to be machined.

References Cited by the Examiner

UNITED STATES PATENTS

| 953,059 | 2/1910 | Roberts | 90—9 |
| 2,006,790 | 7/1935 | Condon | 90—4 |
| 2,107,543 | 2/1938 | Miller | 90—9 |
| 2,156,453 | 5/1939 | Hamilton et al. | 90—1.4 |
| 3,111,697 | 11/1963 | Wilson | 90—1.4 |

FOREIGN PATENTS 147,746  1/1904  Germany.

WILLIAM W. DYER, Jr., *Primary Examiner.*

G. A. DOST, *Assistant Examiner.*